United States Patent Office 2,910,505
Patented Oct. 27, 1959

2,910,505

S-SUBSTITUTED N-BENZHYDRYL PSEUDOTHIO-UREAS AND THEIR PSEUDOTHIOURONIUM SALTS

Stanley O. Winthrop, Montreal, Quebec, Canada, assignor to American Home Products Corporation, New York, N.Y., a corporation of Delaware No Drawing. Application February 17, 1958
Serial No. 715,518

6 Claims. (Cl. 260—564)

This invention relates to new S-substituted derivatives of N-benzhydryl thiourea and to salts of these derivatives. The substituent attached to sulfur is one selected from the group which consists of lower alkyl (up to four carbon atoms) and benzyl.

This application is a continuation-in-part of my copending application, Serial No. 562,662, filed February 1, 1956, now abandoned.

My invention also relates to the preparation of these new chemical compounds; and it is also concerned with a new and improved method for preparing N-benzhydryl thiourea, an intermediate used in the preparation of these new compounds.

The new compounds possess valuable pharmacological properties, being particularly suitable as stimulants for the central nervous system of both animals and human beings. In the amounts administered for these purposes they are non-toxic. Many of these compounds also possess musculotropic activity of a high order.

My new chemical compounds, in base form, may be represented by the generic structural formula:

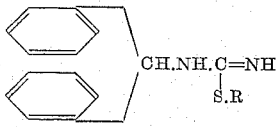

wherein R represents a radical selected from the group which consists of lower alkyl and benzyl radicals. However it will be understood that this structural formula represents the new bases in one of the tautomeric forms, and that the compounds, in a different tautomeric form, may be structurally represented by a somewhat different formula.

My invention also relates to salts of these S-substituted pseudothiourea bases, more particularly to the acid addition salts of these bases.

The acid addition salts, i.e. the N-benzhydryl-S-lower alkylpseudothiouronium or N-benzhydryl-S-benzylpseudothiouronium salts, may be represented by the structural formula:

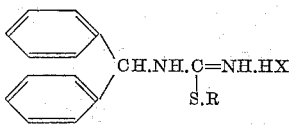

where R is selected from the group consisting of lower alkyl and benzyl, and X is an anion.

By the introduction of a lower alkyl or benzyl substituent attached to sulfur, the thiourea, a nearly neutral compound, is converted to a strongly basic compound capable of forming pseudothiouronium salts. These N-benzhydryl-S-lower alkylpseudothiouronium salts, and N-benzhydryl-S-benzylpseudothiouronium salts, are formed by the addition of an acid such as a hydrohalic acid, maleic acid, acetic acid, sulfuric acid, etc. to the S-substituted N-benzhydryl-pseudothiourea base, or by reacting a lower alkyl or benzyl ester of an inorganic acid, such as methyl iodide, dimethyl sulfate or benzyl chloride, with N-benzhydryl thiourea. The resulting compounds, both in base form, and in the form of their nontoxic salts, are therapeutically active, being stimulants for the central nervous systems of both man and animal, as well as showing musculotropic action. All of the salts disclosed herein are relatively non-toxic to human beings, and they may be utilized, as equivalent to the corresponding bases, in therapeutically effective amounts without objectionable toxic effects.

N-benzhydryl thiourea is a convenient starting material for preparing my new chemical compounds. This intermediate may be prepared by the method of Wheeler, see the American Chemical Journal, volume 26 (1901), page 353; or by the method of Kaye et al. as described in J.A.C.S., volume 74 (1952), pages 403 to 407.

I have also found that this intermediate, N-benzhydryl thiourea, may be conveniently prepared by fusing benzhydrylamine hydrochloride and ammonium thiocyanate in approximately equimolar proportions. After freeing the reaction mixture from water-soluble by-products, the insoluble N-benzhydryl thiourea may be recovered in crystalline form.

In preparing my therapeutically active compounds in the form of the free base, i.e. in preparing an N-benzhydryl-S-lower alkylpseudothiourea, or N-benzhydryl-S-benzylpseudothiourea, various N-benzhydryl-S-lower alkyl- and N-benzhydryl-S-benzyl-pseudothiouronium salts may first be prepared, and the free bases then liberated therefrom by treatment with an alkali. A mild alkali, such as an alkali metal carbonate, is preferably used. This process may be readily carried out at room temperature in a suitable solvent, such as methanol.

The S-substituted-N-benzhydryl pseudothiouronium salts may be prepared by reacting N-benzhydryl thiourea with the lower alkyl or benzyl ester of an inorganic acid, such as methyl iodide, dimethyl sulfate, or benzyl chloride. This is conveniently accomplished by bringing the reactants together in a suitable solvent, such as methanol. As the reaction proceeds only slowly at room temperature, it is preferable to reflux the reaction mixture for a few hours, whereupon the S-lower alkyl- or S-benzyl-substituted N-benzhydryl pseudothiouronium salt precipitates in the solvent. It may be removed therefrom and purified by recrystallization.

My new N-benzhydryl-S-lower alkylpseudothiouronium salts, and N-benzhydryl-S-benzylpseudothiouronium salts, may also be prepared by reacting the free base with an acid. Hydrohalic acid salts, as well as salts of inorganic acids such as sulfuric, and salts of organic acids such as maleic and acetic acids, may be readily prepared by this procedure.

The N-benzhydryl-S-lower alkylpseudothiourea base, or N - benzhydryl - S - benzylpseudothiourea, may be brought into contact with the salt-forming acid in a suitable solvent. The resulting salt, formed in the chemical reaction ensuing, is then recovered. Various solvents may be utilized, in the reaction, but ordinarily I prefer to use methanol, or a mixture of acetone and ether. The reaction, in all cases, proceeds readily at room temperature and maintenance of an elevated temperature is not essential. The crude salt precipitates in the reaction mixture, and it may then be recovered and purified by recrystallization from a suitable solvent, or from a suitable solvent mixture, such as from isopropanol, or from mixed ethanol-ether.

The following examples are illustrative of my invention:

EXAMPLE 1

N-benzhydryl thiourea 107 grams (0.49 mole) of benzhydrylamine hydrochloride and 41.1 grams (0.54 mole) of ammonium thiocyanate were fused together for two hours. Fusion temperatures over the range 125° C. to 160° C. are suitable. For highest yields, however, it is preferred to fuse the reactants together at a temperature of about 140° C. The fusion periods may vary, but at the end of two hours the reaction is usually complete.

The reaction mixture was then treated with boiling water to extract water-soluble materials. The insoluble material remaining was filtered off, dissolved in isopropanol, and recrystallized from this solvent to yield 67 grams of N-benzhydryl thiourea. A typical sample of the crude product melted at 173–175° C. Although not necessary for use in the subsequent reactions, an analytically pure sample may be prepared by two recrystallizations of the product from ispropanol, the pure product melting at aproximately 186–188° C.

EXAMPLE 2

N-benzhydryl-S-methylpseudothiouronium methylsulfate 12.0 grams (0.05 mole) of N-benzhydryl thiourea and 3.15 grams (0.025 mole) of dimethyl sulfate were dissolved in 100 milliliters of methanol and refluxed for three hours. On cooling and evaporating down, an oil residue remained in the reaction mixture, and this oil solidified on standing in ether. The product was N-benzhydryl - S - methylpseudothiouronium methylsulfate, and a typical sample of the crude product melted at 110–118° C. The crude product was then dissolved in isopropanol and recrystallized twice from this solvent to give a substantially pure product which melted at 130.5–132° C. Analyses for carbon nitrogen sulfur and hydrogen confirmed the empiric formula $C_{16}H_{20}N_2S_2O_4$.

EXAMPLE 3

N-benzhydryl-S-methylpseudothiouronium iodide 2.4 grams (0.01 mole) of N-benzhydryl thiourea and 1.4 grams (0.01 mole) of methyliodide were dissolved in 100 milliliters of methanol and refluxed for six hours. On cooling and addition of ether, a solid product precipitated. 3.5 grams of this crude product, a typical sample of which melted at 182–184° C. was thus recovered. This product, N-benzhydryl-S-methylpseudothiouronium iodide, was then dissolved in and recrystallized from isopropanol. After two recrystallizations the substantially pure product melting at 178.5–180° C. was secured. Analyses for iodine, sulfur and nitrogen confirmed the empiric formula $C_{15}H_{17}N_2SI$.

EXAMPLE 4

N-benzhydryl-S-methylpseudothiourea 46 grams (0.12 mole) of N-benzhydryl-S-methylpseudothiouronium iodide was dissolved in a liter of methanol and enough of a 10 percent solution of sodium carbonate was then added to liberate the free base. This precipitated as a solid product and was removed from the methanol.

It was first washed with water and then twice recrystallized from benzene to yield substantially pure N-benzhydryl-S-methylpseudothiourea, melting at 161–162° C. Analysis for nitrogen and sulfur confirmed the empiric formula $C_{15}H_{16}N_2S$.

EXAMPLE 5

N-benzhydryl-S-methylpseudothiouronium chloride 3 grams (0.012 mole) of N-benzhydryl-S-methylpseudothiourea was dissolved in a mixture comprising 50 milliliters of acetone and 50 milliliters of ether. An excess amount of an etheral solution of hydrogen chloride was then added. A solid product which melted at 195–196° C. was precipitated in the reaction mixture. After recrystallization from a mixture of ethanol and ether, the substantially pure salt, N-benzhydryl-S-methylpseudothiouronium chloride, melting at 195–196° C. was obtained. Analyses for nitrogen, sulfur and chlorine confirmed the empiric formula $C_{15}H_{17}N_2SCl$.

EXAMPLE 6

N-benzhydryl-S-methylpseudothiouronium maleate 3 grams (0.012 mole) of N-benzhydryl-S-methylthiourea was dissolved in a mixture of 50 milliliters of acetone and 50 milliliters of ether. 0.9 gram (0.0077 mole) of maleic acid, which had previously been dissolved in a little ether, was then added to the solution. This resulted in a solid precipitate of crude N-benzhydryl-S-methylpseudothiouronium maleate, a typical sample of which melted at 166.5–171° C. The product was then twice recrystallized from a mixture of ethanol and ether to give substantially pure N-benzhydryl-S-methylpseudothiouronium maleate, a typical sample of which melted at 164–165° C. Analyses for nitrogen and sulfur confirmed the empiric formula $C_{17}H_{20}N_2SO_4$.

EXAMPLE 7

N-benzhydryl-S-methylpseudothiouronium bisulfate 3.0 grams (0.012 mole) of N-benzhydryl-S-methylpseudothiourea were dissolved in 50 milliliters of acetone, and a slight excess of sulfuric acid was added to the solution. Upon the addition of ether, a solid product, melting at 204–205° C., precipitated. This solid product was N-benzhydryl-S-methylpseudothiouronium bisulfate. By recrystallization from isopropanol, there was obtained 2.6 grams of purified product melting at 202–203° C. (dec.). Analysis confirmed the empiric formula $C_{15}H_{18}N_2S_2O_2$.

EXAMPLE 8

N-benzhydryl-S-methylpseudothiouronium acetate 3.0 grams (0.012 mole) of N-benzhydryl-S-methylpseudothiourea were dissolved in 50 milliliters of acetone and a slight excess of acetic acid was added to the solution. The acetone was removed in vacuo, i.e. at a reduced pressure less than atmospheric, and the residue was crystallized by trituration with ether. The product resulting was N-benzhydryl-S-methylpseudothiouronium acetate. By recrystallization from ethyl acetate, there was obtained 2.1 grams of the purified product melting at 144–145° C. (dec.). Analysis confirmed the empiric formula $C_{17}H_{20}N_2SO_2$.

EXAMPLE 9

N-benzhydryl-S-methylpseudothiouronium bromide 3.0 grams (0.012 mole) of N-benzhydryl-S-methylpseudothiourea were dissolved in 50 milliliters of acetone and a slight excess of hydrobromic acid was added to the solution. Upon the addition of ether a solid product precipitated. This product was N-benzhydryl-S-methylpseudothiouronium bromide. By recrystallization from acetonitrile there was secured 2.5 grams of a purified product melting at 198.5–199.5° C. Analysis confirmed the empiric formula $C_{15}H_{17}N_2SBr$.

EXAMPLE 10

N-benzhydryl-S-ethylpseudothiouronium iodide 2.4 grams (0.01 mole) of N-benzhydryl thiourea and 2.3 grams (0.015 mole) of ethyliodide were dissolved in 75 milliliters of ethanol and the mixture refluxed for 3 hours. Upon cooling and addition of ether to the solution, an oil precipitated. This oil solidified on standing. The product was N-benzhydryl-S-ethylpseudothiouronium iodide and, after two recrystallizations from isopropanol-ether, the purified product melting at 145–147° C. was secured. Analysis confirmed the empiric formula C$_{16}$H$_{19}$N$_2$SI.

EXAMPLE 11

*N-benzhydryl-S-propylpseudothiouronium iodide*

The procedure followed in making this compound was similar to that given in Example 10.

4.84 grams (0.02 mole) of N-benzhydryl thiourea and 5.1 grams (0.03 mole) of propyliodide were refluxed in 200 milliliters of acetone for six hours. There was thus secured 6.0 grams of the product, N-benzhydryl-S-propylpseudothiouronium iodide in the form of fine needles, melting at 150–151° C. Analysis confirmed the empiric formula C$_{17}$H$_{21}$N$_2$SI.

EXAMPLE 12

*N-benzhydryl-S-propylpseudothiourea*

1.0 gram of N-benzhydryl-S-propylpseudothiouronium iodide, as prepared in Example 11, was dissolved in aqueous methanol and a solution of sodium carbonate was added. The free base, N-benzhydryl-S-propylpseudothiourea, precipitated and was filtered off and washed with water. It melted at 75–77° C. Analysis confirmed the empiric formula C$_{17}$H$_{20}$N$_2$S.

EXAMPLE 13

*N-benzhydryl-S-isopropylpseudothiouronium iodide*

2.4 grams (0.01 mole) of N-benzhydryl thiourea and 2.5 grams (0.015 mole) of isopropyliodide were dissolved in 75 milliliters of ethanol and the solution was refluxed for 5 hours. The solution was then cooled and ether added, whereupon a solid product precipitated. This product was N-benzhydryl-S-isopropylpseudothiouronium iodide. Upon recrystallization from isopropanol-ether the purified product melting at 185–186.5° C. resulted. Analysis confirmed the empiric formula C$_{17}$H$_{21}$N$_2$SI.

EXAMPLE 14

*N-benzhydryl-S-butylpseudothiouronium iodide*

By following the procedure described in Example 11 and starting with 4.84 grams (0.02 mole) of N-benzhydryl-thiourea and 5.5 grams (0.03 mole) of butyliodide there was obtained 6.4 grams of N-benzhydryl-S-butylpseudothiouronium iodide in the form of fine needles melting at 160–161° C. Analysis confirmed the empiric formula C$_{18}$H$_{23}$N$_2$SI.

EXAMPLE 15

*N-benzhydryl-S-butylpseudothiourea*

By following the procedure described in Example 12 and starting with 1 gram of N-benzhydryl-S-butylpseudothiouronium iodide, as prepared in Example 14, there was obtained 0.6 gram of the free base, N-benzhydryl-S-butylpseudothiourea. The compound melted at 77–79° C. and analysis confirmed the empiric formula C$_{18}$H$_{22}$N$_2$S.

EXAMPLE 16

*N-benzhydryl-S-benzylpseudothiouronium chloride*

2.42 grams (0.01 mole) of N-benzhydryl thiourea and 1.9 grams (0.015 mole) of benzylchloride were dissolved in 75 milliliters of ethanol and the solution was refluxed for three hours. Upon cooling, followed by evaporation to dryness, there was secured an oily residue which solidified on standing. The product was N-benzhydryl-S-benzylpseudothiouronium chloride. After recrystallization first from toluene, and then from acetonitrile, the purified product melting at 168–172° C. was secured. Analysis confirmed the empiric formula C$_{21}$H$_{21}$N$_2$ClS.

EXAMPLE 17

*N-benzhydryl-S-benzylpseudothiourea*

By following the procedure described in Example 12, and treating the N-benzhydryl-S-benzylpseudothiouronium chloride, as prepared in Example 16, with a solution of sodium carbonate in aqueous methanol, the free base was obtained. This was N-benzhydryl-S-benzylpseudothiourea, melting at 94–97° C. Analysis confirmed the empiric formula C$_{21}$H$_{20}$N$_2$S.

I claim:

1. A compound selected from the group which consists of bases of the formula

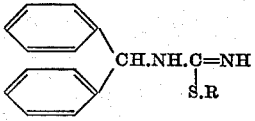

where R is selected from the group consisting of lower alkyl and benzyl, and the chloride, bromide, iodide, methyl sulfate, bisulfate, acetate and maleate salts thereof.
2. N-benzhydryl-S-methylpseudothiourea.
3. N-benzhydryl-S-propylpseudothiourea.
4. N-benzhydryl-S-butylpseudothiourea.
5. N-benzhydryl-S-benzylpseudothiourea.
6. N-benzhydryl-S-isopropylpseudothiouronium iodide.

References Cited in the file of this patent

UNITED STATES PATENTS

| | | |
|---|---|---|
| 1,723,696 | Hahl et al. | Aug. 6, 1929 |
| 2,086,822 | Schubert et al. | July 13, 1937 |

OTHER REFERENCES

Schroeder: Chem. Reviews, vol. 55, pp. 181–221 (1955).

Kaye et al.: J.A.C.S., vol. 74, pp. 403–407 (1952).

Wheeler: American Chemical Journal, vol. 26 (1901), p. 353.

Borovicka et al.: Chemical Abstracts, vol. 45, p. 577 (1951).